US011519384B2

(12) United States Patent
Monto

(10) Patent No.: US 11,519,384 B2
(45) Date of Patent: *Dec. 6, 2022

(54) VENTURI VORTEX AND FLOW FACILITATING TURBINE

(71) Applicant: Mark Monto, Studio City, CA (US)

(72) Inventor: Mark Monto, Studio City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,835

(22) Filed: May 25, 2021

(65) Prior Publication Data

US 2021/0277865 A1 Sep. 9, 2021

Related U.S. Application Data

(63) Continuation-in-part of application No. 16/052,536, filed on Aug. 1, 2018, now Pat. No. 11,022,096.

(51) Int. Cl.
*F03D 3/06* (2006.01)
*F03D 3/04* (2006.01)
*F03D 3/00* (2006.01)
*F03D 9/39* (2016.01)

(52) U.S. Cl.
CPC ............. *F03D 3/067* (2013.01); *F03D 3/005* (2013.01); *F03D 3/0427* (2013.01); *F03D 9/39* (2016.05); *F05B 2240/133* (2013.01)

(58) Field of Classification Search
CPC ........ F03D 3/04; F03D 3/0427; F03D 3/0436; F03D 3/0409; F03D 3/0445; F03D 3/0454; F03D 3/0463; F03D 3/0472; F03D 3/0481; F03D 3/049
See application file for complete search history.

(56) References Cited

U.S. PATENT DOCUMENTS

| | | | | |
|---|---|---|---|---|
| 4,079,264 A | * | 3/1978 | Cohen | F03D 1/04 415/4.4 |
| 4,162,410 A | * | 7/1979 | Amick | F03D 15/00 416/DIG. 4 |
| 4,236,866 A | * | 12/1980 | Zapata Martinez | F03D 9/00 416/126 |
| 4,309,146 A | * | 1/1982 | Hein | F03D 3/0409 415/4.4 |
| 4,452,046 A | | 6/1984 | Valentin | |
| 4,609,827 A | | 9/1986 | Nepple | |

(Continued)

FOREIGN PATENT DOCUMENTS

EP 1681462 A2 7/2006
WO 2017027151 2/2017

*Primary Examiner* — Justin D Seabe
(74) *Attorney, Agent, or Firm* — Cionca IP Law P.C.; Marin Cionca

(57) ABSTRACT

A wind harvesting assembly for a wind turbine, having: a Venturi tube having a hollow interior having a first air pressure; an open top end having a first diameter; an open bottom end having the first diameter; a tube length spanning between the open top end and the open bottom end; and a constricted section located above the bottom end, the constricted section adapted to increase a velocity of air passing through by having a second diameter smaller than the first diameter; a plurality of vertical wind turbine blades arranged around the Venturi tube, an outlet disbursement blade assembly disposed below the bottom open end of the Venturi tube and a port fan positioned coaxially with the Venturi tube.

20 Claims, 14 Drawing Sheets

(56) References Cited

U.S. PATENT DOCUMENTS

| | | | |
|---|---|---|---|
| 4,935,639 A * | 6/1990 | Yeh | F03D 3/00 |
| | | | 290/55 |
| 6,249,059 B1 * | 6/2001 | Hosoda | F03D 1/04 |
| | | | 290/55 |
| 6,638,005 B2 | 10/2003 | Holter et al. | |
| 6,666,650 B1 | 12/2003 | Themel | |
| 7,211,905 B1 | 5/2007 | McDavid | |
| 7,288,850 B2 | 10/2007 | Hicks et al. | |
| 7,504,740 B2 | 3/2009 | Murakami et al. | |
| 7,605,491 B1 | 10/2009 | Chung | |
| 7,811,048 B2 | 10/2010 | Allaei | |
| 7,969,036 B2 * | 6/2011 | Chung | F03D 9/25 |
| | | | 290/55 |
| 8,128,337 B2 * | 3/2012 | Pezaris | F03D 9/25 |
| | | | 415/4.4 |
| 8,207,625 B1 * | 6/2012 | Cristo | F03D 15/10 |
| | | | 290/55 |
| 8,727,698 B1 | 5/2014 | Pickett et al. | |
| 8,729,724 B2 * | 5/2014 | Tai | F03D 3/04 |
| | | | 290/55 |
| 8,734,084 B1 | 5/2014 | Lovas | |
| 8,790,068 B2 * | 7/2014 | Cantwell | F03D 3/02 |
| | | | 416/41 |
| 9,243,610 B2 * | 1/2016 | Degala | F03D 1/04 |
| 9,291,148 B2 * | 3/2016 | Allaei | F03D 1/06 |
| 9,371,818 B1 * | 6/2016 | Monto | F03D 3/0409 |
| 11,022,096 B2 * | 6/2021 | Monto | F03D 3/005 |
| 2004/0100103 A1 | 5/2004 | Becherucci et al. | |
| 2004/0183310 A1 | 9/2004 | Mowll | |
| 2010/0148516 A1 | 6/2010 | Buhtz | |
| 2011/0316279 A1 | 12/2011 | Bahari et al. | |
| 2012/0261918 A1 | 10/2012 | Hanback | |
| 2013/0307276 A1 | 11/2013 | Ko | |

* cited by examiner

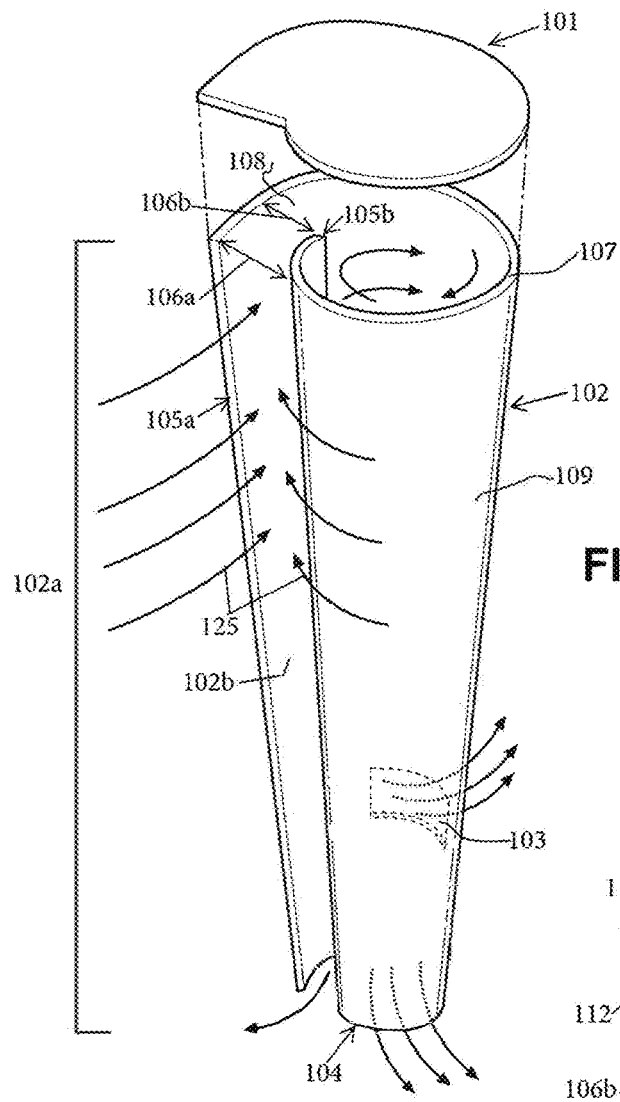
FIG. 1A - Prior Art
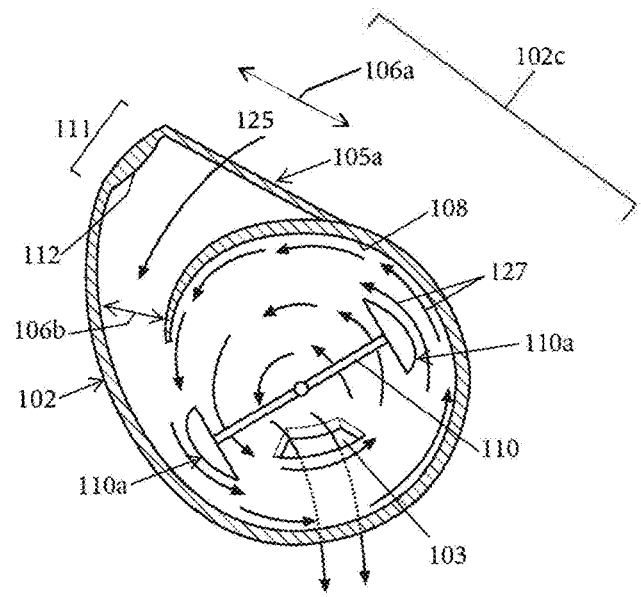
FIG. 1B - Prior Art

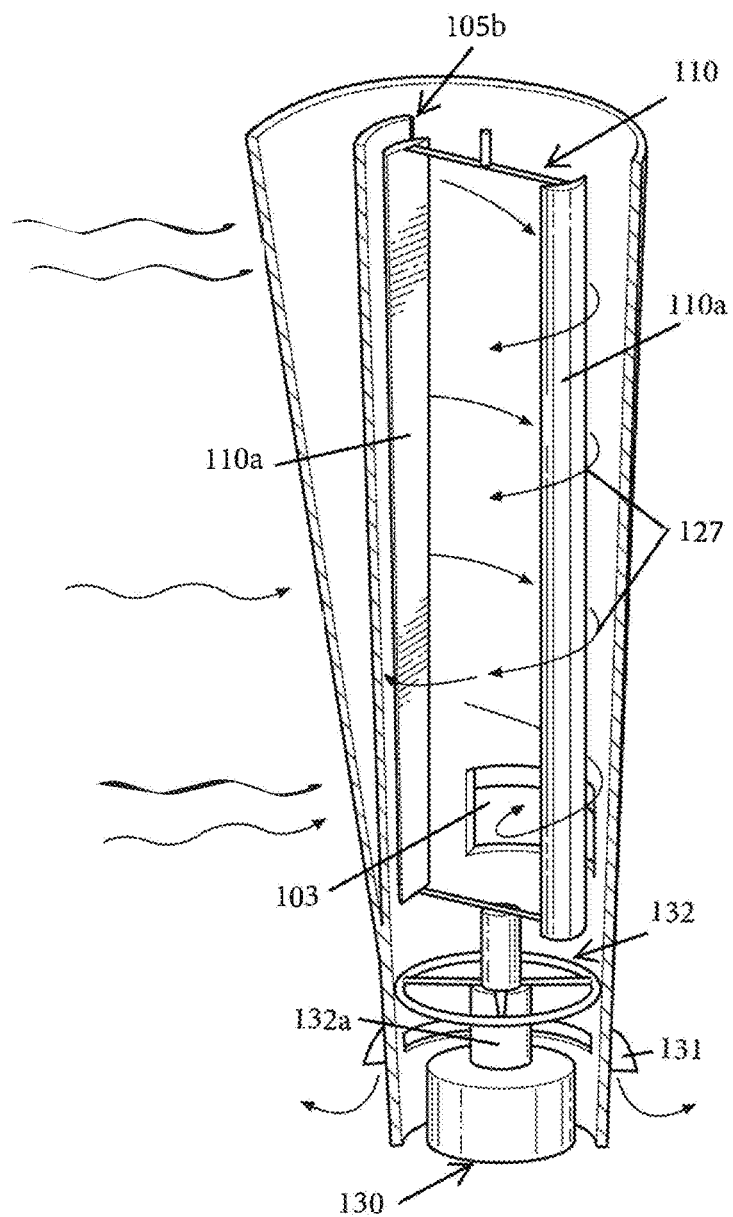
FIG. 1C - Prior Art

VENTURI VORTEX AND FLOW FACILITATING TURBINE

CROSS-REFERENCE TO RELATED APPLICATIONS

This application is a continuation-in-part of U.S. Non-Provisional application Ser. No. 16/052,536, filed Aug. 1, 2018, which is hereby incorporated by reference, to the extent that it is not conflicting with the present application.

BACKGROUND OF INVENTION

1. Field of the Invention

The invention relates generally to wind turbines and more particularly to methods, systems, and apparatuses for increasing the efficiency of wind turbines by taking advantage of the Venturi effect.

2. Description of the Related Art

Horizontal Wind Turbines (HWTs) and Vertical Axis Wind Turbines (VAWTs) used for harnessing wind energy have several drawbacks, which include a large amount of space needed for power generation, damage to the turbine blades by bird strikes, potential damage to other structures or harm to a population if a blade is ejected from the turbine or if ice buildup on the blades are thrown, as well as other problems. A cyclonic aeolian vortex (CAV) turbine can solve some of the issues associated with HWTs and VAWTs by providing a blade rotor encased in a cavity shell configured to increase the efficiency of the turbine, wherein the shell has an intake opening that takes advantage of the Venturi effect, the Bernoulli effect, and the Coanda effect, to concentrate the wind ingested energy into the shell and convert it into a vortex, thus increasing the energy of the ingested wind and decreasing the pressure inside of the shell, which then creates a suction effect that pulls more wind into the shell. The CAV turbine may perform even more efficiently with additional features that facilitate a stable vortex or axial fluid flow, and facilitate a quick expulsion of the vortex and other air from the shell enclosure at its base, which, in turn, can then facilitate the maintenance of a lower pressure for suctioning in of more air. CAV turbines also, like other vertical wind turbines, may be presented with certain challenges when starting up in a slow wind speed environment. Another challenge for vertical wind turbines including CAV turbines may be that the shell of the CAV turbine needs to point into the wind for their operation, and there is a need for an efficient way for a vertical turbine to be able to point into a desired direction for wind harvesting, or, capture and guide air into the wind turbine. Therefore, there is a need for further exploration of the various elements and features that may be provided with vertical wind turbines.

FIGS. 1A-1C show a cyclonic aeolian vortex (CAV) turbine as known in the prior art. The following is provided to better understand the additional features and benefits presented by a Venturi vortex and flow facilitating turbine (VVFF turbine), and how these features enhance a vertical turbine system referred to as the CAV turbine as known in the art, and as described herein when referring to FIGS. 1A-1C. What follows is a description of the CAV turbine which was the subject of application Ser. No. 14/822,728, by applicant, which is now U.S. Pat. No. 9,371,818.

FIG. 1A illustrates an exploded perspective view of a cyclonic aeolian vortex (CAV) turbine, having the cap of the cavity shell lifted for illustration purposes, as known in the art.

FIG. 1B illustrates the top view of a cyclonic aeolian vortex (CAV) turbine, having the cap of the shell removed for illustration purposes, as known in the art.

FIG. 1C shows a sectional view of a cyclonic aeolian vortex (CAV) turbine, as known in the art.

The CAV turbine as known in the art may be configured to take advantage of the well-known Bernoulli, Coanda and Venturi and boundary layer effects in order to more efficiently ingest and harvest the kinetic energy of the winds. Briefly stated, according to the Bernoulli principle, as the speed of a fluid increases the static pressure within the fluid decreases; according to the Coanda principle, a moving stream of fluid in contact with a curved surface will tend to follow the curvature of the surface of the boundary layer rather than traveling in a straight line; finally, the Venturi effect is the reduction of a fluid pressure when the fluid flows through a constricted section.

As shown, the CAV turbine 100 as known in the art may have a housing or shell 102 shaped to take advantage of the three principles stated above. In one aspect, as shown, the shell 102 may be a sheet (e.g., a metallic sheet) formed in a funnel-like or spiral-like shape having an intake opening 102b for its entire height/length 102a. As can be better observed in FIG. 1B, the top or cross-sectional views of the shell/housing 102 may resemble a spiral or numeral 6 (six). It should be understood that other shapes may be adopted as long as they enable the shell 102 to capture the functions described herein.

As shown, the shell 102 may be defined by a top edge 107, a bottom edge 104, an outer edge 105a, an inner edge 105b, and a curved and smooth exterior surface 109 and a corresponding interior, also curved and smooth, surface 108. The intake opening 102b can, in some aspects, be adjusted to open and close. For example, the intake opening 102b may close to protect the CAV turbine during severe weather conditions or winds (such as the configuration shown as an example in FIG. 1B), or open by various degrees to allow more or less air to enter the turbine as needed in order to enhance a balanced and efficient air flow through the blades.

The shell 102 may also have a cap 101, which may be secured air-tightly to the top edge 107 in order to ensure proper operation of the CAV turbine 100, namely by preventing air on the inside of shell 102 from escaping through the top of the shell. Again, only for illustration purposes, cap 101 is shown detached from top edge 107. By contrast, the bottom of the shell 102 as defined by bottom edge 104 may be open, thus permitting air on the inside the shell 102 to exit thereby, as shown in FIG. 1. In addition, an exhaust opening 103 may be provided near the bottom edge 104 to supplement the exhaust area provided by the open bottom of the shell 102. The exhaust opening 103 may be adjustable from fully closed to fully open as needed to variably supplement the exhaust area provided by the open bottom, and thus prevent disturbances in the air flow inside shell 102.

As better seen in FIGS. 1B-1C, the shell 102 may have a substantially circular portion 102c that may encase a rotor 110 having, for example, two opposite airfoil blades 110a. It should be noted that the airfoil blades 110a may be curved on the outer surfaces and flat on the opposite inner surfaces to provide lift and thus cause rotation of the rotor 110.

It should be noted that the wind 125 may be normally ingested through the entire length/height 102a of opening 102b. For simplification of illustration, the ingested wind 125 is represented in FIG. 1A by curved arrows entering shell opening 102b only in the upper half of shell opening 102b. Also, as shown, the shell opening 102b may be configured such that after initially passing through a wider section 106a of the shell opening 102b (as shown in FIG. 1B), the ingested wind 125 is forced to travel through progressively narrowing sections culminating in a constricted section 106b. This exemplary configuration of the shell/housing 102 and its opening 102b takes advantage of the Venturi effect to increase the velocity of the ingested wind 125, and thus its kinetic energy to be harvested, as it is forced to pass through constricted section 106b. It should be observed that the configuration of opening 102b also guides the ingested wind 125 towards the interior curved surface 108. This configuration takes advantage of the Coanda effect to cause at least a substantial portion of the ingested wind 125 to flow near the curved interior surface 108 as it seeks to exit through the open shell bottom and/or exhaust opening 103. Consequently, the air flow inside the shell 102 is substantially a cyclonic/vortex/swirl/spiral-down type flow ("cyclonic air flow," or "vortex") 127, as better seen in FIG. 1C. This cyclonic air flow 127, having an increased velocity because of the Venturi effect and following the inside curvature of the shell because of the Coanda effect, may provide an increased effectiveness in harvesting its kinetic energy by continuously approaching the blades 110a at an optimum angle of incidence and reaction force, substantially for the entire length/height of the blades 110a (see FIG. 1C).

As better seen in FIG. 1B, the cyclonic air flow 127 may provide the lift to blades 110a and thus cause the spinning of the rotor 110. It should be observed that when air lift blades 110a are used, the air will travel faster over the outer curved surface of the blades 110a (thus with lower pressure) and comparatively slower (thus with higher pressure) near the inner flat surface of the blades 101a, causing lift of the blades.

As shown in FIG. 1B, the shell 102 may have an airfoil portion 111 having a curved interior surface 212. The ingested wind 225 traveling over the curved surface 112 will increase in speed because of Bernoulli effect, thus supplementing the Venturi effect in increasing the velocity of the incoming/ingested wind 125, as described above. Also because of the Bernoulli effect, the increased speed of the air inside the shell 102 translates to lower pressure inside the shell when compared with the atmospheric pressure outside the shell 102, which may be of a higher pressure than that of the inside. This may help to create a suction effect that helps to push more wind inside the shell, thus more kinetic energy to be harvested by blades 110a becomes available. This is yet another aspect that increases the efficiency of the CAV turbines disclosed herein.

It should be noted that, as shown in FIG. 1C, the rotor 110 may be coupled to a generator 130 such that electricity is generated when the rotor 110 spins. A yaw system 132 may also be provided, which may rotate only the housing 102 of the turbine into the direction of available wind energy, so that a parabolic airfoil portion 111 and shell opening 102b are in an optimum or desired position for wind harvesting. The shell housing 102 rotation can be accomplished by varying configurations. Most notably, in larger applications, as with horizontal wind turbines, a yaw motor 132a may be utilized in conjunction with an anemometer to determine wind speed and direction, and thus rotate the shell 102 accordingly. Further, computer-controlled yaw systems available with current turbines could be fitted into the disclosed turbines as well, to account for yaw correlation in order to achieve maximum performance and efficiency. A natural fin yaw regulator (not shown) could also be used in smaller applications. Current HWTs may have expensive and elaborate safety systems to brake and slow turbines during high wind conditions or environments. The disclosed CAV turbines, with the shell 102 element in particular, could simply rotate away from winds in dangerous high wind conditions without the added hardware needed in HWTs currently in use.

Thus, in an aspect, a CAV turbine as described is provided, the turbine having a blade rotor encased into a cavity shell configured to increase the efficiency of the turbine, wherein the shell has an intake opening that takes advantage of the Venturi effect to accelerate the wind ingested into the shell, thus increasing the energy of the ingested wind and decreasing the pressure inside the shell, thus creating a lower pressure suction effect that pushes more wind into the shell.

In another aspect, the cavity shell has an airfoil that takes advantage of the Bernoulli effect to contribute to the acceleration of the ingested air and also to increase the ratio of harvested wind.

In another aspect, the shell has a substantially circular cross-section to take advantage of the Coanda effect to convert the ingested wind into a vortex that constantly approaches the blades at the optimum angle of attack.

In another aspect, the shell is configured to facilitate the formation of a natural eddy between the vortex and the laminar flow and turbulent flow, outside the path of the blades, thus preventing drag and also contributing to the suction effect.

In another aspect the shell has an exhaust portion to release pressure inside the cavity and thus ensure continuous inflow of wind through the shell intake opening.

In another aspect, the CAV turbine is adapted for high wind regimes by providing an expanded leeward portion of the shell and/or by sealing a bottom portion of the shell intake opening.

In another aspect, a yaw system is provided that rotates the shell into the direction of available wind energy, so that the airfoil and shell intake opening are in optimum position for wind harvesting.

In another aspect, guiding vanes are provided on the airfoil portion of the shell to enhance the downward flow of the ingested wind and to reduce turbulence.

In another aspect, the CAV turbine can be installed vertically to replace current vertical wind turbines. In another aspect, the CAV turbine can be installed horizontally, such as under a bridge.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a wind harvesting assembly for a wind turbine is provided, the wind harvesting assembly comprising: a Venturi tube having: a hollow interior having a first air pressure; an open top end having a first diameter; an open bottom end having the first diameter; a tube length spanning between the open top end and the open bottom end; and a constricted section located above the bottom end, the constricted section being adapted to increase a velocity of air passing through the Venturi tube and cause an expulsion of air out of the Venturi tube by having a second diameter smaller than the first diameter; a plurality of vertical wind turbine blades arranged around the Venturi tube, an outlet disbursement blade assembly disposed below the open bottom end of the Venturi tube, comprising: a flat ring having a solid outer portion and an open inner portion, the solid outer portion having a top surface attached to the bottom ends of the vertical wind turbine blades, a bottom surface, an outer surface and an inner surface; and a plurality of curved disbursement blades, the curved disbursement blades being attached to bottom surface of the solid outer portion of the flat ring; and a port fan positioned coaxially with the Venturi tube and within the open inner portion of the flat ring, comprising: a plurality of angled fan blades; a central connection hub to which the angled fan blades centrally connect; and a hub mount attached to the inner surface of the outer portion of the flat ring to which the central connection hub is attached; wherein the first air pressure within the hollow interior is lower than a second air pressure outside of the wind harvesting assembly, resulting in a pressure differential that causes a "suction effect" of a first portion of air into the open top end from wind passing over the wind harvesting assembly, such that the first portion of air becomes the air passing through the Venturi tube; and wherein the rotation of the plurality of vertical wind turbine blades is caused when a second portion of air is ingested into the wind turbine and forced to become a vortex having a higher speed than the ingested air, the vortex being a spiral air stream traveling towards the open bottom end. Thus, an advantage is that wind energy ingested both radially and axially may be used to establish and maintain a lowest pressure zone near the exit points of air from the turbine, which may help to maintain the stability of the vortex, as well as initiate rotor rotation within low wind environments. Another advantage is that both axial and radial winds may apply an immediate rotational force upon the rotor, helping to maintain or initiate rotor rotation under low wind conditions. Another advantage is that air may be suctioned more effectively into the Venturi tube due to the rotation of a port fan, which may help further maintain the lowest pressure zone near the exit points of wind from the turbine and quickly expel air from the turbine. Another advantage is that the Venturi tube may increase wind speeds traveling through the turbine, which may allow for more rapid expulsion of air from the turbine, thus maintaining stability of the wind vortex within the turbine. Another advantage is that air expelled into the base may be radially dispersed due to the rotation of the outlet disbursement blade assembly, allowing for superior expulsion of wind from the turbine.

In another aspect, a wind turbine comprising a wind harvesting assembly and a housing is provided, the wind harvesting assembly being encased in a hollow housing interior of the housing, the housing having: a top housing end; a base at a bottom housing end, the base having a hollow base interior, a top base end, a bottom base end, and means for a first expulsion of air out of the wind turbine; an intake opening spanning between the top housing end and the bottom housing end; a Venturi tube having: a hollow interior having a first air pressure; an open top end having a first diameter, the open top end being located at the top housing end; an open bottom end having the first diameter, the open bottom end being located at the top base end; a tube length spanning between the open top end and the open bottom end; and a constricted section located above the bottom end, the constricted section being adapted to increase a velocity of air passing through the Venturi tube cause a second expulsion of air out of the Venturi tube by having a second diameter smaller than the first diameter; a plurality of vertical wind turbine blades arranged around the Venturi tube, and wherein each vertical blade of the plurality of vertical wind turbine blades has: a blade top end; a blade bottom end; and a blade length spanning between the blade top end and the blade bottom end, the length being the same as the tube length, and being aligned with the tube length, such that the blade top end is aligned with the open top end, and the blade bottom end is aligned with the open bottom end; an outlet disbursement blade assembly disposed below the open bottom end of the Venturi tube; wherein the first air pressure within the hollow interior is lower than a second air pressure outside of the wind harvesting assembly, resulting in a pressure differential that causes a suction effect of a first portion of air into the open top end from wind passing over the wind harvesting assembly; and wherein the rotation of the plurality of vertical wind turbine blades is caused when a second portion of air is ingested into the wind turbine and forced to become a vortex having a higher speed than the ingested air, the vortex being a spiral air stream traveling towards the open bottom end. Again, an advantage is that a lowest pressure zone may be maintained near the exit points of the air from the wind turbine, which may help to maintain stability of the vortex of air captured inside the wind turbine. Another advantage is that the lowest pressure zone may help the wind turbine to begin turning while in low wind speed environments. Another advantage is that the blade assembly may be provided in smaller sizes than other similar wind turbines, such that the blade rotation can be started with a lower wind speed, and also reduce cost and materials of the wind turbine construction. Another advantage is that the Venturi tube may help to increase wind speeds traveling through the wind turbine and more efficiently harvest the power from the air, and more quickly expel air out of the wind turbine, which may also help to maintain stability of the wind vortex within the wind turbine. Another advantage is that air expelled into the base may be radially dispersed due to the rotation of the outlet disbursement blade assembly, allowing for superior expulsion of wind from the turbine and thus maintenance of the lowest pressure zone. In another aspect, a wind harvesting assembly for a wind turbine is provided, the wind harvesting assembly comprising: a Venturi tube having: a hollow interior having a first air pressure; an open top end having a first diameter; an open bottom end having the first diameter; a tube length spanning between the open top end and the open bottom end; and a constricted section located above the bottom end, the constricted section adapted to increase a velocity of air passing through the Venturi tube and cause an expulsion of air out of the Venturi tube by having a second diameter smaller than the first diameter; and a plurality of vertical wind turbine blades arranged around the Venturi tube such that each vertical blade of the plurality of vertical wind turbine blades is disposed between a shell of the wind turbine and the Venturi tube; and a port fan positioned coaxially with the Venturi tube and wherein a rotation of the plurality of vertical wind turbine blades is caused by wind ingested into the wind turbine. Again, an advantage is that a lowest pressure zone may be maintained near the exit points of the air from the wind turbine, which may help to maintain stability of the vortex of air in the wind turbine. Another advantage is that the lowest pressure zone may help the wind turbine to begin turning while in low wind speed environments. Another advantage is that the blade assembly may be provided in smaller sizes than other similar wind turbines, such that the blade rotation can be started with a lower wind speed, and also reduce cost and materials of the wind turbine construction. Another advantage is that the Venturi tube may help to increase wind speeds traveling through the wind turbine and more efficiently harvest the power from the air, and more quickly expel air out of the wind turbine, which may also help to maintain stability of the wind vortex within the wind turbine. Another advantage is that both axial and radial winds may apply an immediate rotational force upon the rotor, helping to maintain or initiate rotor rotation under low wind conditions. Another advantage is that air may be suctioned more effectively into the Venturi tube due to the rotation of a port fan, which may help further maintain the lowest pressure zone near the exit points of wind from the turbine and quickly expel air from the turbine. The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 1A illustrates an exploded perspective view of a cyclonic aeolian vortex (CAV) turbine, having the cap of the cavity shell lifted for illustration purposes, as known in the art.

FIG. 1B illustrates the top view of a cyclonic aeolian vortex (CAV) turbine, having the cap of the shell removed for illustration purposes, as known in the art.

FIG. 1C shows a sectional view of a cyclonic aeolian vortex (CAV) turbine, as known in the art.

DETAILED DESCRIPTION

Figure 2A:
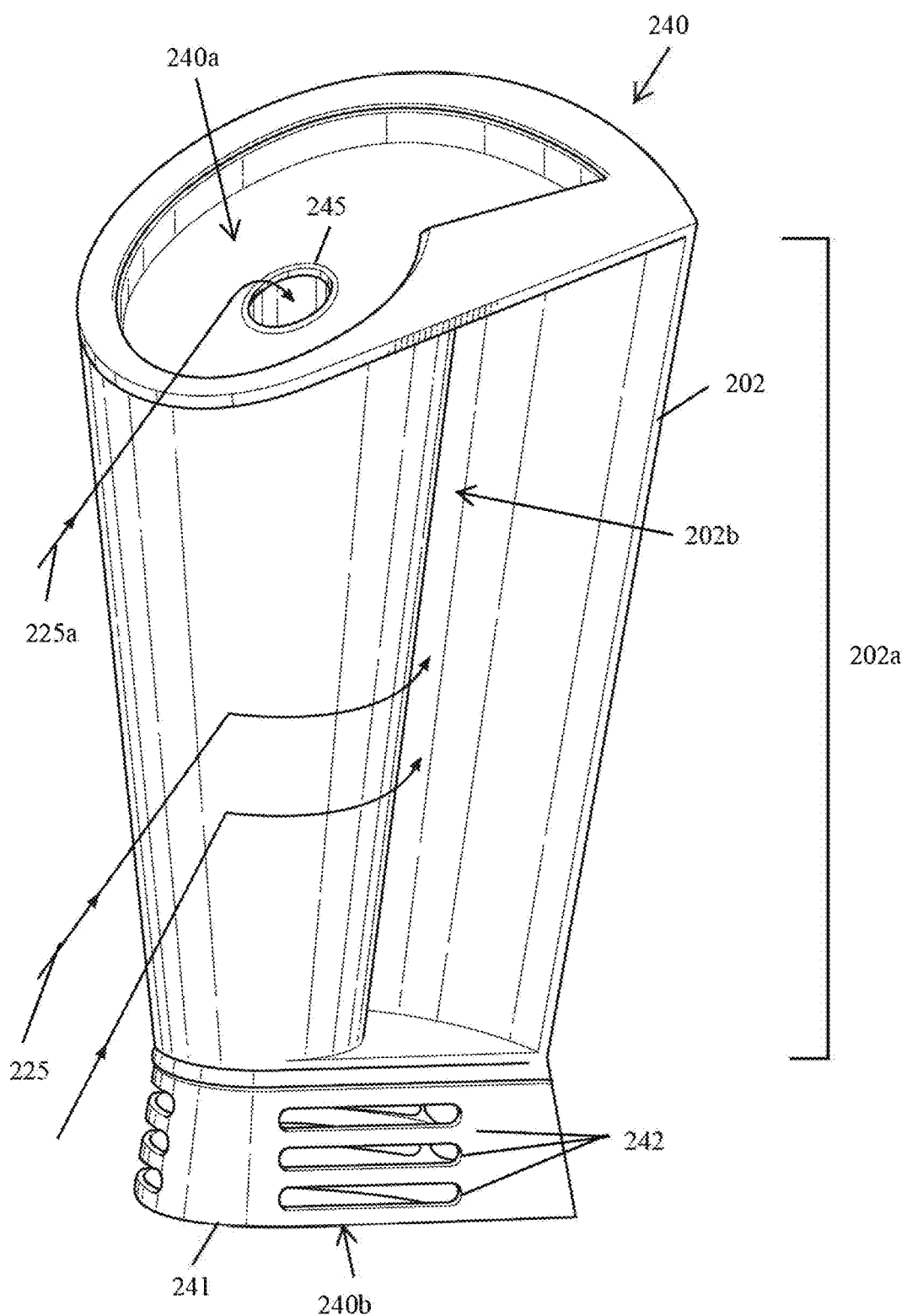
FIGS. 2A-2B illustrate the top perspective view and the side perspective view, respectively, of a Venturi vortex flow facilitating wind turbine (VVFF), according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 340 and 440, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 2B:
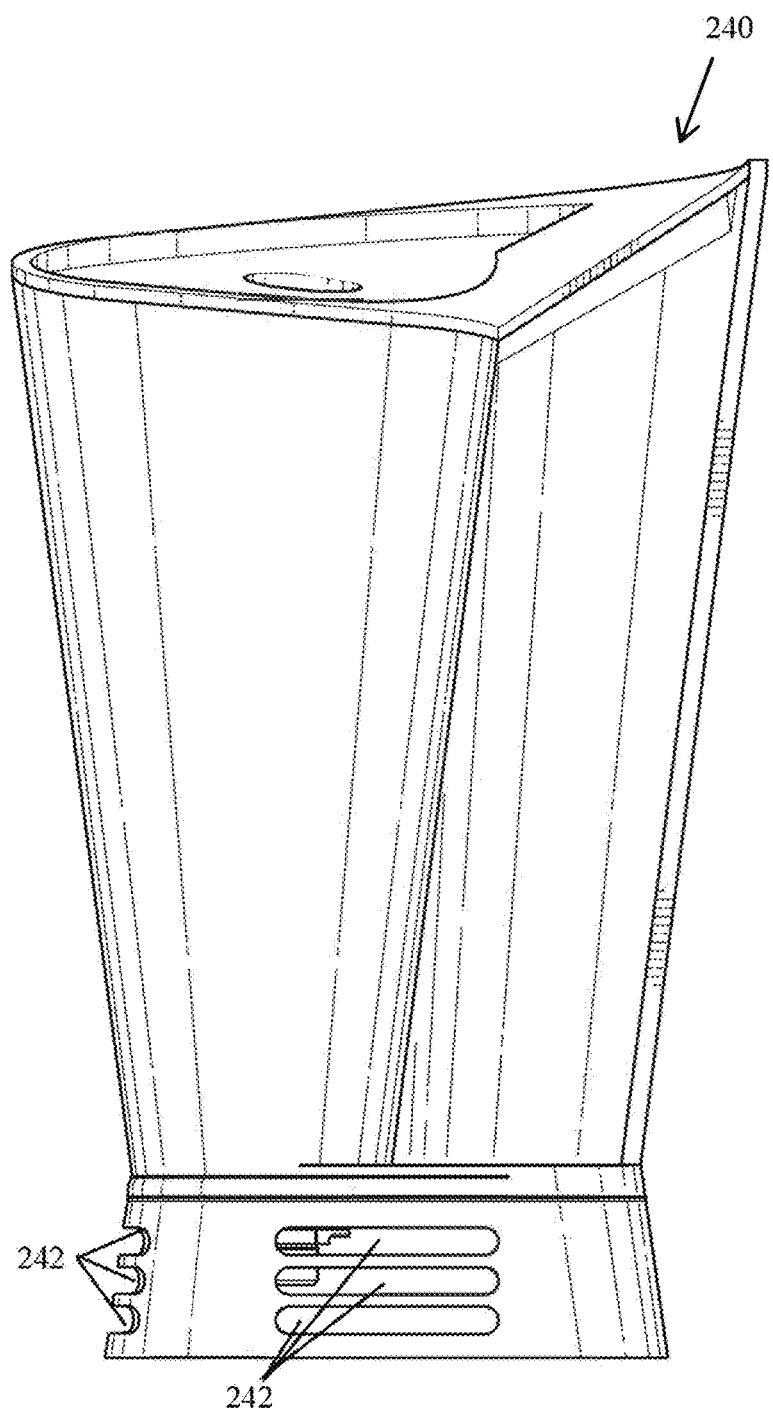

FIGS. 2A-2B illustrate the top perspective view and the side perspective view, respectively, of a Venturi vortex and flow facilitating wind turbine ("Venturi flow turbine," "Venturi Vortex Flow Facilitator," or "VVFF turbine") 240, according to an aspect. The VVFF turbine 240 may be provided with various elements to assist in the following for more efficiently harvesting the kinetic energy of the winds: manifesting a steady low pressure zone within the turbine, facilitating the creation of a stable vortex within the turbine, expulsion of harvested air axially down and radially out of the turbine, and the use of air passing over the turbine in the operation of the turbine.

The VVFF turbine 240 may be provided with a shell 202 ("shell," "blade housing," "turbine housing," or "housing"), which, as described previously, may be a sheet (e.g., a metallic sheet) formed in a funnel-like or spiral-like shape having an intake opening ("intake opening" or "vertical intake opening") 202b spanning the entire height/length 202a of the turbine housing. Again, it should be understood that other shapes may be adopted as long as they enable the shell 202 to capture the functions described herein. The environmental wind 225 may be normally ingested through the entire length/height 202a of the intake opening 202b. The wind 225 may also be ingested in from the upper opening 245, which may be located at the top end 240a of the turbine 240. An advantage may be that winds that may normally pass over a turbine without an upper opening may, with the addition of the upper opening 245, now be utilized in the operation of the turbine 240 and may assist in a more efficient operation of the turbine by passing through a Venturi tube (as will be described in further detail when referring to FIGS. 3A-4).

The VVFF turbine 240 may also be provided with a base 241, which may comprise the bottom end 240b of the turbine 440, and the base 241 may have air vents or diffusers ("diffusers," "grates," "vents," or "stationary radial diffusers") 242. As an example, the base 241 may be provided with an open bottom at the bottom end 240*b* of the turbine for the release of air, or vents 242, or both an open bottom and vents 242. The base 241 may also have a closed end as shown as an example in FIG. 5. The vents 242 may be of any suitable size or shape, such as the examples shown in FIG. 2, or may also resemble the examples shown in FIG. 3. The vents 242, and/or the open bottom of the turbine may serve as exit points for the harvested wind that entered the turbine. As will be described further, the interior of the turbine may maintain a zone of comparatively lower pressure ("low pressure zone") in contrast to the external air of the environment around the turbine ("high pressure zone"). The low pressure zone may help to expel the harvested wind through these exit points. The low pressure zone may also assist the turbine 240 in starting a rotation of its blades when in a slow wind speed environment or condition.

These elements may also allow the VVFF turbine to operate as a passive system by taking advantage of the stack effect, which refers to the movement of air through a building or similar structure resulting from the height of the building or structure, and resulting from a pressure differential between the inside of the structure and the environment.

Figure 3A:
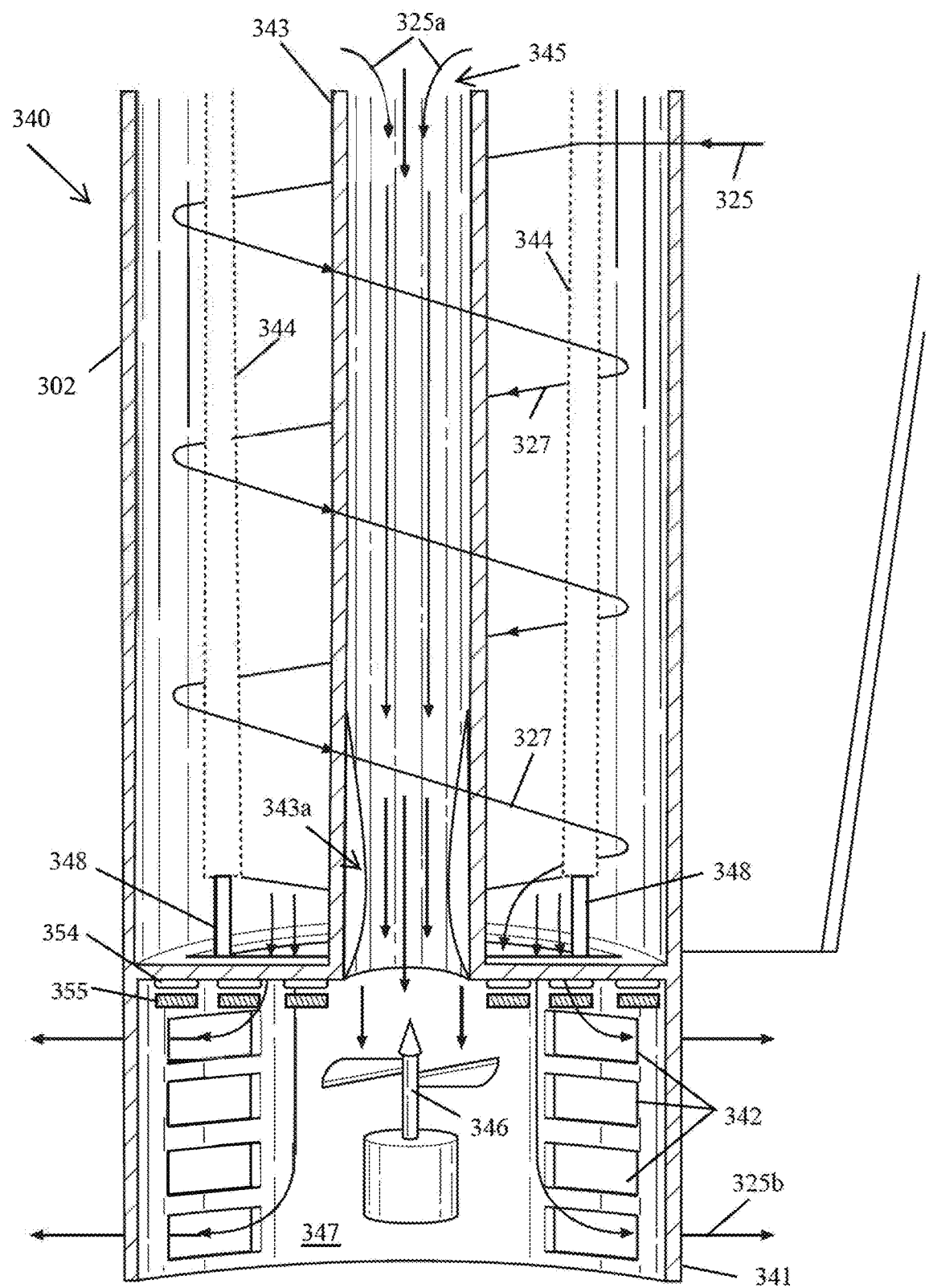
FIGS. 3A-3B illustrate the partial cross-sectional side views of examples of a VVFF turbine, according to an aspect.
Figure 3B:
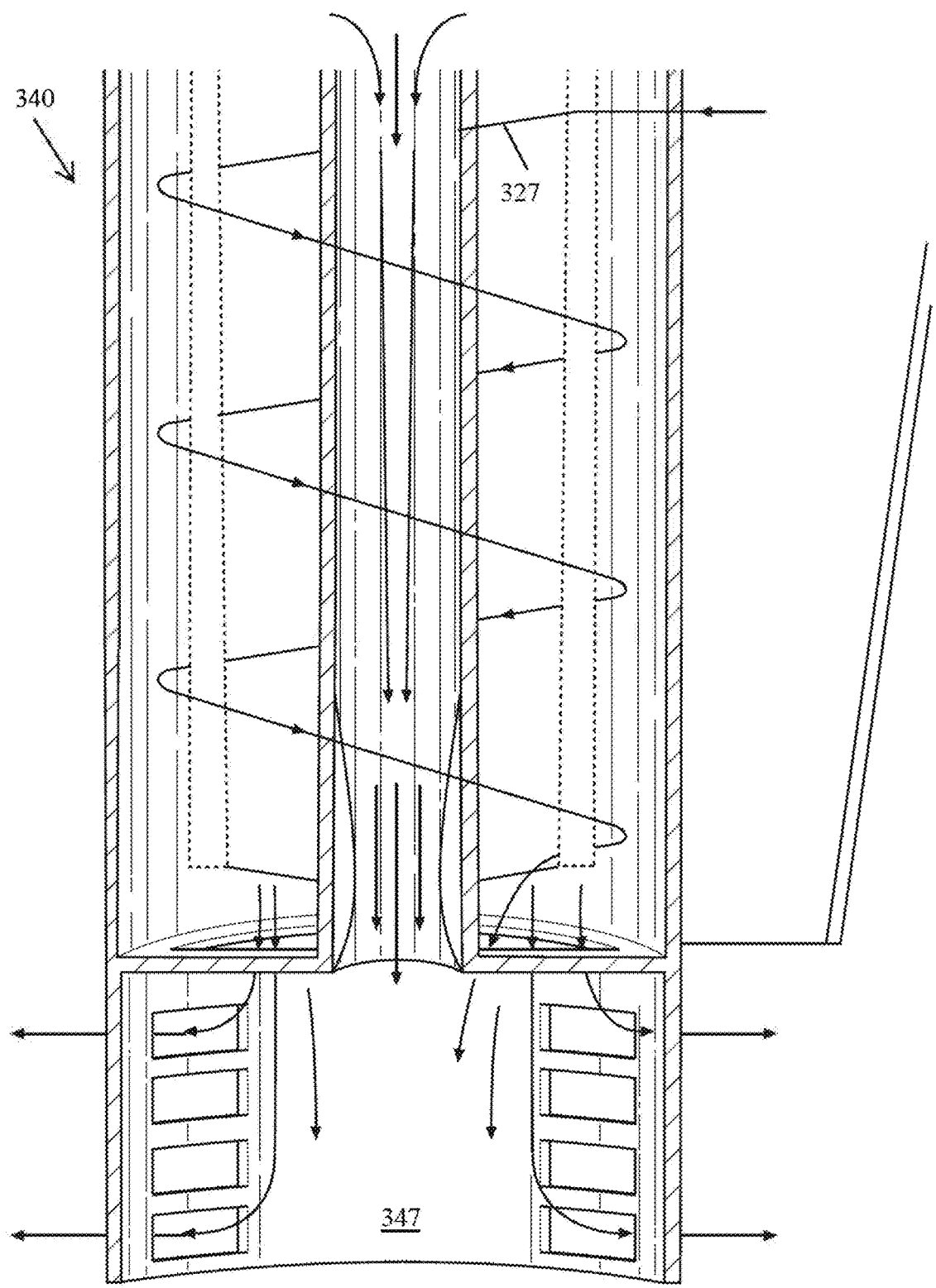

FIGS. 3A-3B illustrate the partial cross-sectional side views of examples of a VVFF turbine 340, according to an aspect. The VVFF turbine 340 may be provided with a Venturi tube 343 at the center of the interior of the housing 302. The upper opening 345 may lead air into the Venturi tube 343, and thus, wind 325*a* may enter from the upper opening and travel downwards through the Venturi tube 343. The Venturi tube 343 may be provided with a constricted section 343*a* which may be situated near the bottom end of the tube. The Venturi tube 343 may be straight, until the constricted section 343*a* where the tube is narrowed, and then the tube may, as shown, widen again to a same width as above the constricted section 343*a*. The constricted section 343*a* may cause wind coming down through the Venturi tube 343 to naturally become accelerated due to the Venturi effect. The combination of this accelerated wind and the lower air pressure located at the base of the Venturi tube 343 may, similar to the exhaust opening 103 of FIG. 1A, help to expel air from the base of the turbine such that air stoppage is relieved. The combination of the Venturi tube and the lowered air pressure may thus provide an efficient and active system for air expulsion from the bottom end of the VVFF turbine.

Similar to the exemplary configurations as described in FIGS. 1A-1C, the VVFF turbine 340 may, again, take advantage of the Venturi effect via the Venturi tube, to increase the velocity of the ingested wind 325*a*, as it is forced to pass through the constricted section of the Venturi tube. Again, as previously discussed, the Venturi effect is the reduction of a fluid pressure when the fluid flows through a constricted section, which further dictates that a velocity of a fluid passing through the constricted section increases. Thus, this system may increase the amount of kinetic energy that can be harvested from the wind by increasing the velocity of air traveling into the turbine.

Air flowing down the Venturi tube and subjected to the Venturi effect may travel naturally down the flue created by the Venturi tube and create a draft of wind that assists in stabilizing the vortex that is created by the turning of the turbine blades 344. When the VVFF turbine 340 is provided with a Venturi tube 343, blades 110*a* as shown in FIGS. 1B-1C may be blocked by the Venturi tube 343 and thus unable to rotate within the turbine as previously described. The VVFF turbine 340 may thus, as an example, be provided with a turbine blade assembly as shown, having a plurality of vertical blades 344 situated around the Venturi tube 343. Each vertical blade 344 of the plurality of vertical blades ("turbine blade," "vertical turbine blade," or "vertical blade") 344 may rotate individually on its own vertical axis. Each vertical turbine blade 344 may be secured within the housing of the turbine by any suitable means, such as, for example, by being associated with stationary mount 348 on the floor of the housing as shown. Each vertical blade 344 may rotate on its vertical axis when a wind vortex, represented by arrows 327, is created within the turbine from the wind 325 ingested through the intake opening 302*b*. The rotation of the vertical blades 344 may cause a generation of energy via a generator (as shown by 130 in FIG. 1C as an example, and as shown by 530 in FIG. 5), magnets 354 at the base of the vertical blades 344, and coils 355, which may, for example, be static copper coils. The magnets 354 may rotate via the vertical blades 344 over the coils 355 for energy production, for example. The plurality of vertical blades 344 situated around the central Venturi tube may be smaller than the rotor blade assembly as shown by 110 in FIG. 1B as an example. Thus, the smaller vertical blades 344 may be able to begin rotating in slower wind speeds than a larger blade assembly, and the turbine could thus start in slower wind speeds. The central Venturi tube 343 spanning the length of the turbine housing may also serve to block any errant wind energy from crossing the diameter of the housing, such that a steady wind vortex 327 may be maintained.

The base 341 of the VVFF turbine 340 may have a hollow interior space ("base hollow interior space," "base interior," "base hollow interior") 347 within which a negative pressure zone may be maintained. The base interior 347 may also house various elements, such as electronics, battery storage, and any other suitable equipment for pointing the turbine into the direction of the wind, for example. As shown in FIG. 3A, the VVFF turbine 340 may be provided with a base blade 346 (which may be referred to as an "active negative pressure system" or "active system") within the base 347, or, as shown in FIG. 3B, the VVFF turbine 340 may be provided without a base blade (which may be referred to as a "passive negative pressure system" or "passive system"). The base blade 346 may assist in creating negative pressure by assisting in pulling air down and through the base. This air 325*b* may then be vented out of the shell through vents 342 or through an open bottom, or both, and thus the base blade may also be referred to as a "negative pressure blade." The low pressure zone maintained within the base interior 347 may be the lowest pressure ("lowest pressure zone") when compared to the low pressure zone of the Venturi tube, and to the high pressure zone of the exterior environment (as will be further described when referring to FIG. 4). This lowest pressure zone may help to stabilize the wind vortex 327, and may also help to better stabilize the wind vortex 327 when in low speeds and high speeds of the harvested wind. During such conditions, without the low pressure zone, the wind vortex 327 may destabilize. With the low pressure zone created within the base interior 347, the wind vortex 327 may be sustained for longer and may also be created more easily. This effect may be referred to as a "pre-start effect." Additionally, the base blade 346 may also help to power auxiliary devices such as, for example, a slow start motor for the main turbine, a yaw control motor to point turbine into oncoming wind, or may also power a storage battery, or any other suitable devices.

Figure 4:
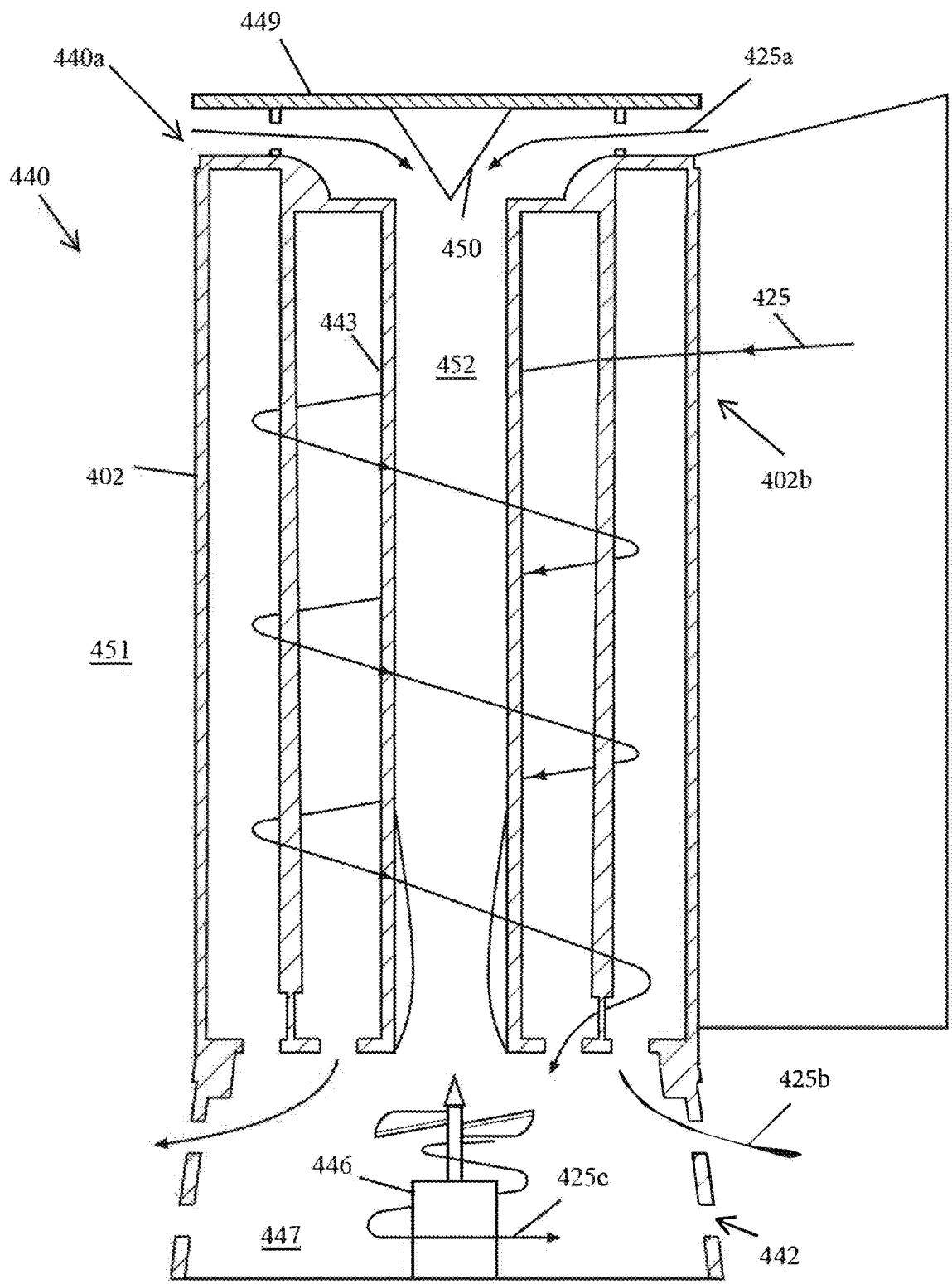
FIG. 4 illustrates the cross-sectional side view of another example of a VVFF turbine, according to an aspect.

FIG. 4 illustrates the cross-sectional side view of another example of a VVFF turbine 440, according to an aspect. The VVFF turbine 440 may be provided with an upper frame ("upper frame," "top frame," or "frame") 449 at the upper end 440a of the turbine, which may be elevated above the upper end 440a. The upper frame 449 may be provided with a wind guide 450, which may assist in pointing the turbine 440 into the wind, by rotating as needed and by having a shape that points inwards into the Venturi tube 443, for example. The wind guide 450 may be pointed, may have a cone shape, or any other suitable shape for pointing and guiding wind and errant gusts into the Venturi tube 443. As an example, the wind guide 450 may be stationary and be accessible to the winds in 360 degrees without the need for movement. As another example, the wind guide 450 may be able to rotate a full 360 degrees on top of the turbine, while the top frame 449 is also stationary, or the wind guide 450 and the frame 449 may rotate together on top of the turbine. The rotation of the wind guide 450 about the top of the turbine may enable the wind guide 450 to thus point into a desired direction for creating a guide or path for incoming wind to follow and flow into the Venturi tube 443 of the turbine. Again, the wind guide 450 may be vane-shaped, or may be cone-shaped, or any other suitable shape for guiding wind down into the Venturi tube. The wind guide 450 may, again, be further adapted to guide wind into the Venturi tube by being rotatable about the open top end, such that the pointed shape is in a desired position to catch and guide wind into the Venturi tube. As an example, wind around the turbine may push and position the wind guide into the desired position for optimally catching wind and guiding wind into the Venturi tube 443.

Pressure differentials may exist between the exterior environment 451, within the interior 452 of the Venturi tube 443, and within the base interior 447. Of these, the exterior environment 451 may have air pressure that is the highest ("high pressure zone"), and the interior 452 of the Venturi tube may have air pressure that is lower ("low pressure zone"), and the interior of the base 447 may have air pressure that is the lowest ("lowest pressure zone" or "lower pressure zone"). The low and lower pressure zones may help to suction effect air expanded into the turbine, and may also help to expel the harvested air 425b back out of the bottom end of the turbine, creating room for more air to move downwards and continue the harvesting of energy from the wind. The efficiency of this process may be assisted by these pressure differentials.

Again, also because of the Bernoulli effect, the increased speed of the air inside the shell 402 translates to lower pressure inside the shell when compared with the atmospheric pressure 451 outside the shell, as described. This may create a suction effect that helps attract more wind inside the shell through the intake opening 402b, thus increasing the amount of kinetic energy that could be harvested by the turning of the turbine blades.

The expulsion of air out of the bottom end of the turbine may also be assisted by a base blade 446, which may create a vortex of air 425c which may then be expelled radially through vents 442.

Figure 5:
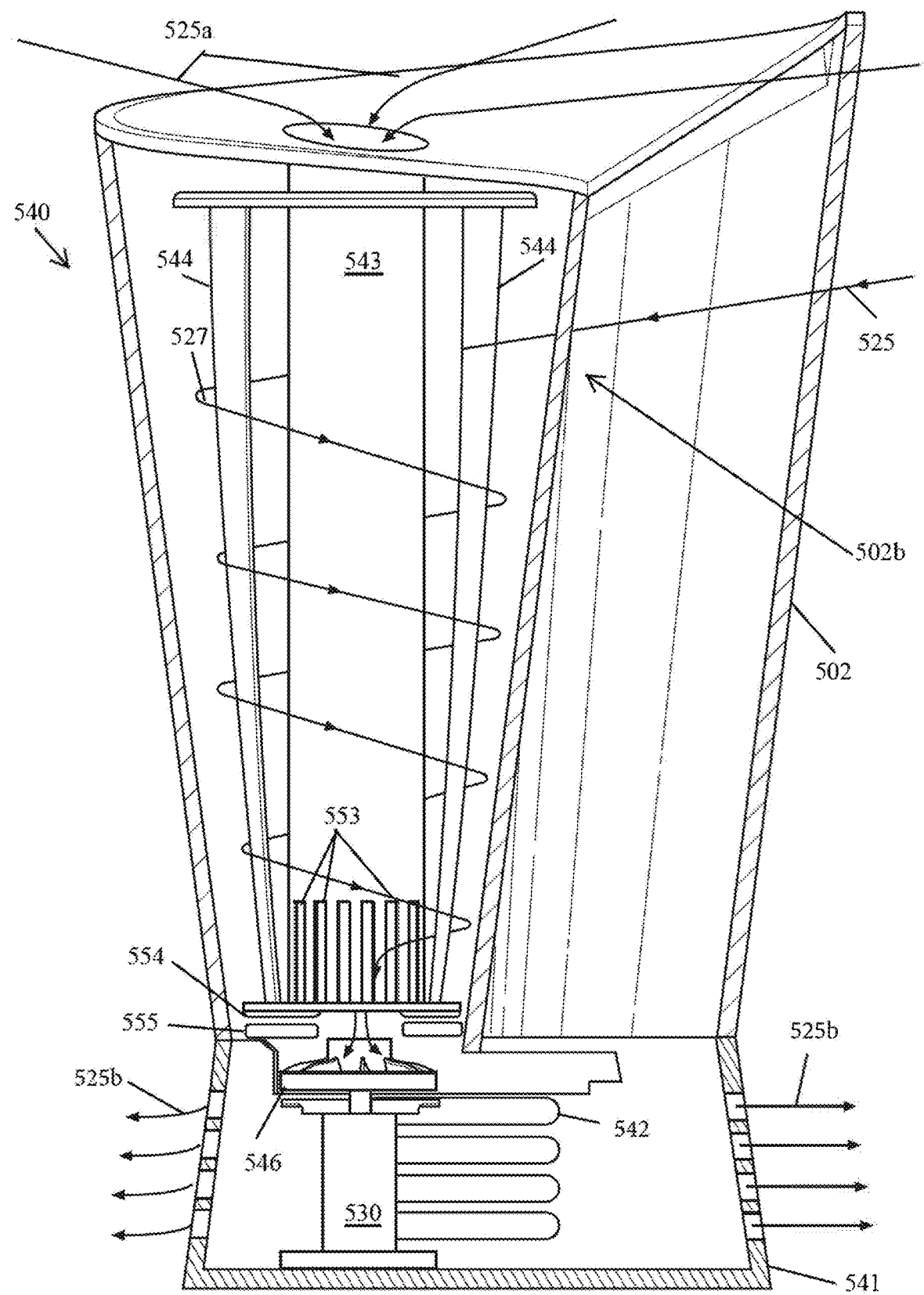
FIG. 5 illustrates the partial cross-sectional side perspective view showing an example of a wind harvesting assembly in the interior of the VVFF turbine, according to an aspect.

FIG. 5 illustrates the partial cross-sectional side perspective view showing an example of a wind harvesting assembly in the interior of the VVFF turbine 540, according to an aspect. The VVFF turbine 540 may be provided with a plurality of turbine blades 544 situated around the Venturi tube and housed within the shell or housing 502, which may be turned by wind 525 ingested through the intake opening 502b, which may become a vortex 527 circling around the plurality of turbine blades 544. Wind 525a may also be ingested down into the Venturi tube 543.

With the addition of the Venturi tube, and blade assembly inside of the cyclonic aeolian vortex turbine taking advantage of the inverse type stack effect in warmer temperatures due to the air outside the turbine being warmer than the interior shell, the air that would normally travel over the top of the CAV turbine may then be utilized in the operation of the VVFF turbine. As an example, a base blade may be installed at the bottom of the interior of the turbine, which may then be rotated by the air traveling down through the Venturi tube 543. The air that is sucked in through the Venturi tube 543 may be able to generate a small amount of electricity via the generator 530, which can then be used in various functions such as assisting in starting the main turbine, or generating electrical or mechanical power for auxiliary devices including battery storage. Again, the magnets 554, stationary coils 555, and generator 530 may then generate electrical energy via the turning of the vertical turbine blades 544. Thus, the inclusion of the Venturi tube 543 may enable the turbine 540 to begin turning even in slow wind conditions.

The Venturi tube 543 may also be provided with vents ("Venturi tube vents") 553 at its base, which may assist in pushing air out of the shell 502. This action may be further assisted by the base blade 546 and guide vanes (as shown by 450 in FIG. 4). The accelerated air leaving the bottom of the Venturi tube 543 radially and leaving through the Venturi tube vents 553, combined with the lowest air pressure within the base may all help to expel air 525b from the turbine, and alleviate any air blockage present at the base of the turbine.

Figure 6A:
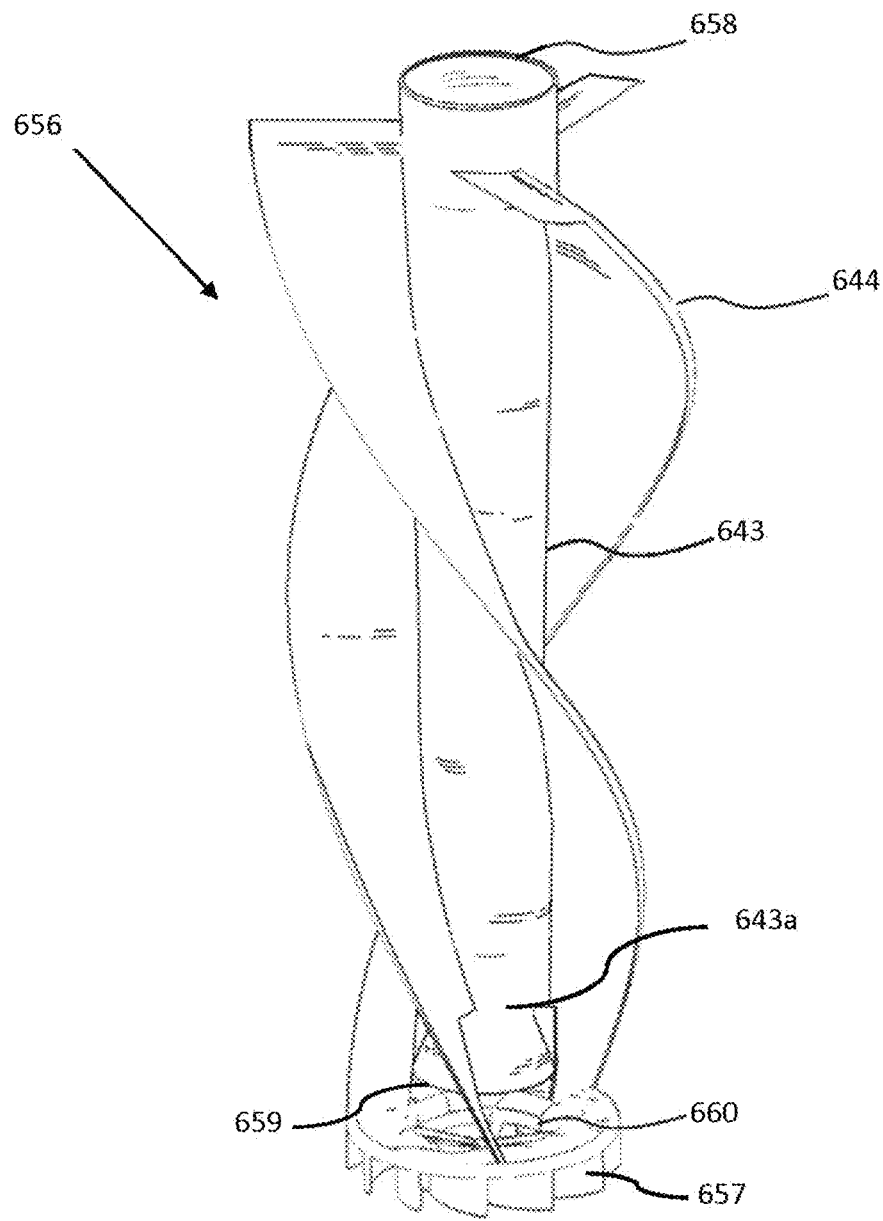
FIG. 6A-6B illustrate the top perspective view and the side perspective view, respectively, of a specialized mixed flow turbine blade rotor, according to an aspect.
Figure 6B:
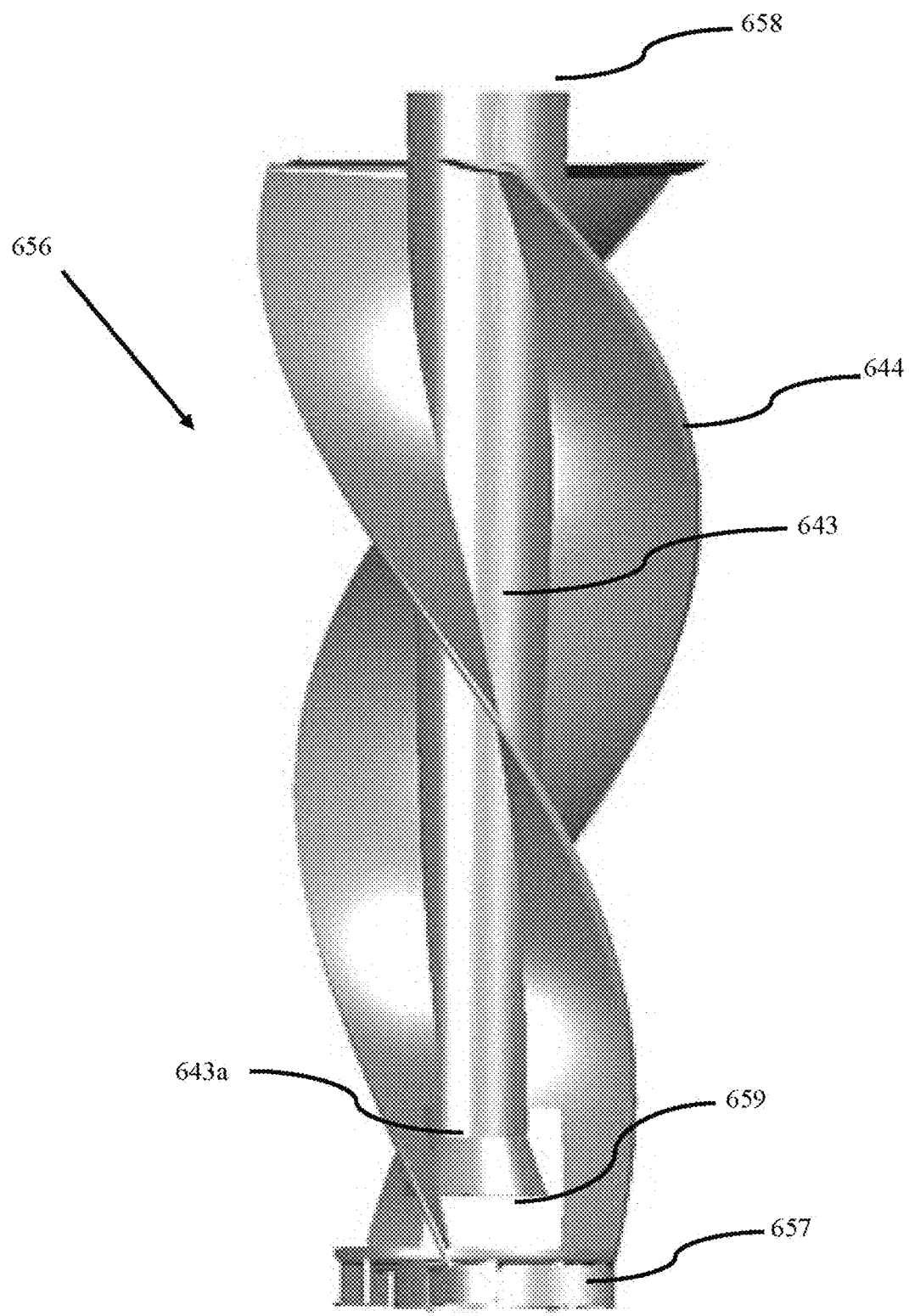

FIG. 6A-6B illustrate the top perspective view and the side perspective view, respectively, of a specialized mixed flow turbine blade rotor 656, according to an aspect. The specialized mixed flow turbine blade rotor may act as a wind harvesting assembly within a CAV or VVFF turbine and may include one or more vertical blades 644 of varying angles and sizes, based upon environmental conditions and turbine assembly. The vertical blade(s) may be attached to an axially oriented Venturi tube 643 or arranged around it, having said Venturi tube incorporated into the structure of the cavity turbine. Both methods may enhance the structural stability of the turbine during rotation due to polar moment of inertia, especially at high RPM. The Venturi tube has an open top end 658 and an open bottom end 659 with a constricted section 643a above the bottom end, in order to accelerate the air traveling down through the Venturi tube to allow for rapid expulsion of axially ingested air into the base. The vertical blade(s) have a top end and a bottom end, which align with the top and bottom ends of the Venturi tube, respectively, and a blade length running along the length of the Venturi tube. An outlet disbursement blade assembly 657, composed of a flat ring with a solid outer portion and open inner portion, the outer portion having a top surface connected to the bottom ends of the vertical blades, a bottom surface, an outer surface and an inner surface, and curved blades arranged on the bottom surface of the outer portion of the flat ring, may be implemented below the bottom opening of Venturi tube. This outlet disbursement blade assembly may allow for superior radial expulsion of wind out of the base during rotation, thus helping to maintain the lowest pressure environment within the base interior, and a stable vortex of wind within the turbine. One or more port fans 660 having a plurality of angled blades connected to a hub connector, and the hub connector being attached to a hub mount, may be positioned coaxially with the Venturi tube near its top 658 or bottom 659 to utilize rotational energy to accelerate air flow induction into the base for expulsion, to further maintain the lowest pressure zone in the base interior.

Port fans 660 may be implemented anywhere within the height of the Venturi tube, as well as below its bottom opening 659, but to best exploit the axial flow of wind through the Venturi tube 643, a port fan 660 may be placed coaxially with the Venturi tube 643 below its bottom opening 659, where the axial wind has already fully accelerated due to traveling through the constricted section 643a. For a port fan 660 placed below the Venturi tube bottom opening 659, its respective hub mount may be placed within the open inner portion of the flat ring and attached to the inner surface of the outer solid portion of the flat ring. The port fan(s) may be rigidly secured to the rotor assembly or be able to rotate independently of the rotor. When allowed to rotate independently of the rotor, the port fan(s) may be used in conjunction with a power generation motor in the base to exploit the axial flowing air to generate electricity without rotating the entire rotor. The vertical blades, outlet disbursement blade assembly, port fan(s) and Venturi tube may be attached accordingly to each other through suitable means, including welding, and/or be constructed as one or more unified piece(s).

This rotor design may allow for the utilization of both lift force, as a result of axially ingested air, and impulse force, as a result of radially ingested air, to maintain a low pressure within the cavity turbine and Venturi tube, as well as guide and accelerate the used air rotationally through the turbine cavity to be expelled axially at its base, to maintain a lowest pressure at the base interior. The angle of the vertical blades 644 may be optimized to maximally harvest energy from the incoming axial wind, while simultaneously guiding and it downward into the base, to maintain a low pressure zone within the turbine cavity and a help maintain the lowest pressure zone within the below attached base interior. The rotor may be attached to an electrical motor through various methods, depending on the type of cavity turbine used, as well as operational environment.

Figure 7A:
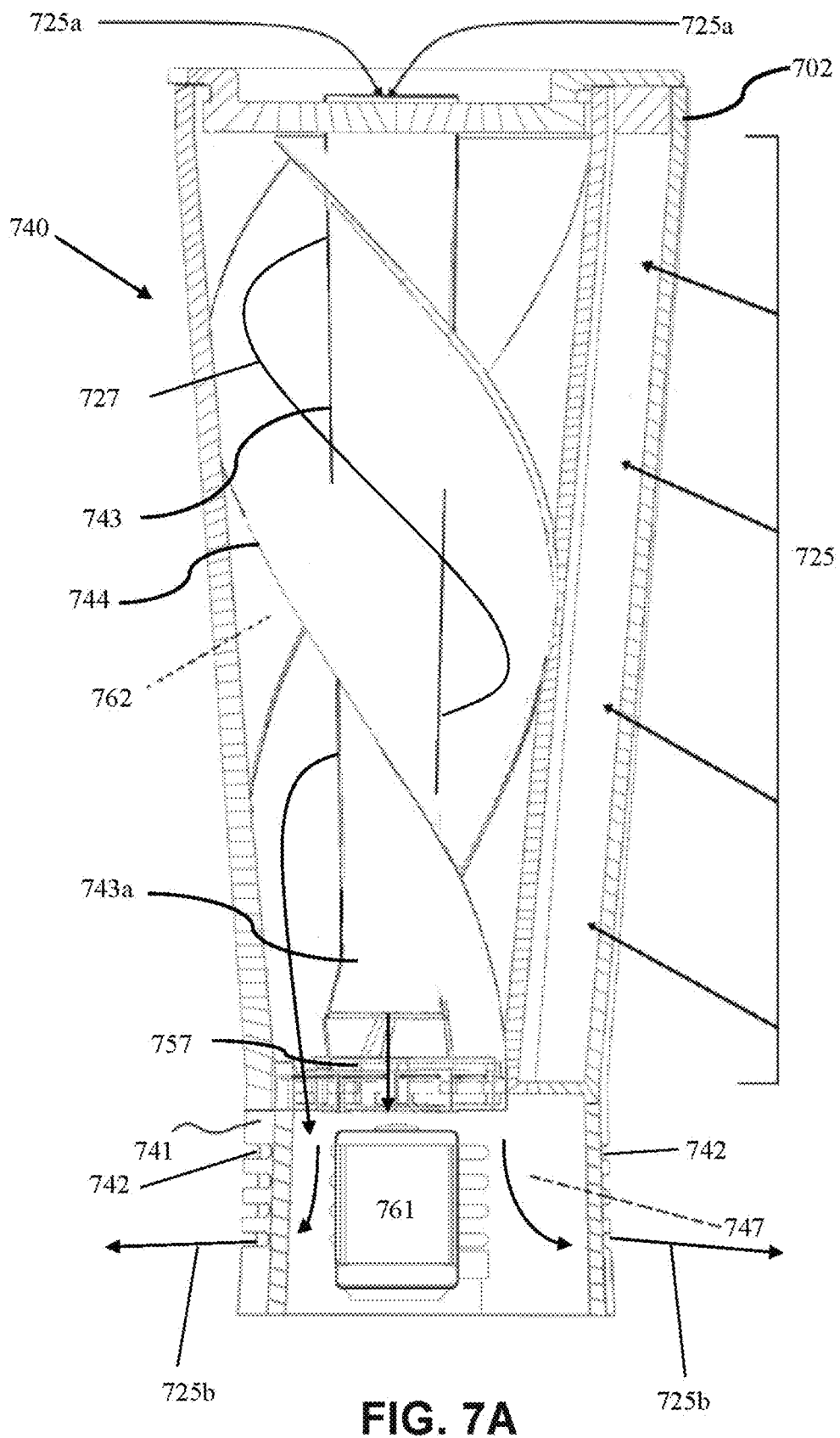
FIG. 7A-7B illustrate the partial cross-sectional side view and the top perspective view, respectively, of a VVFF turbine with a specialized mixed flow turbine blade rotor and electrical motor, according to an aspect.
Figure 7B:
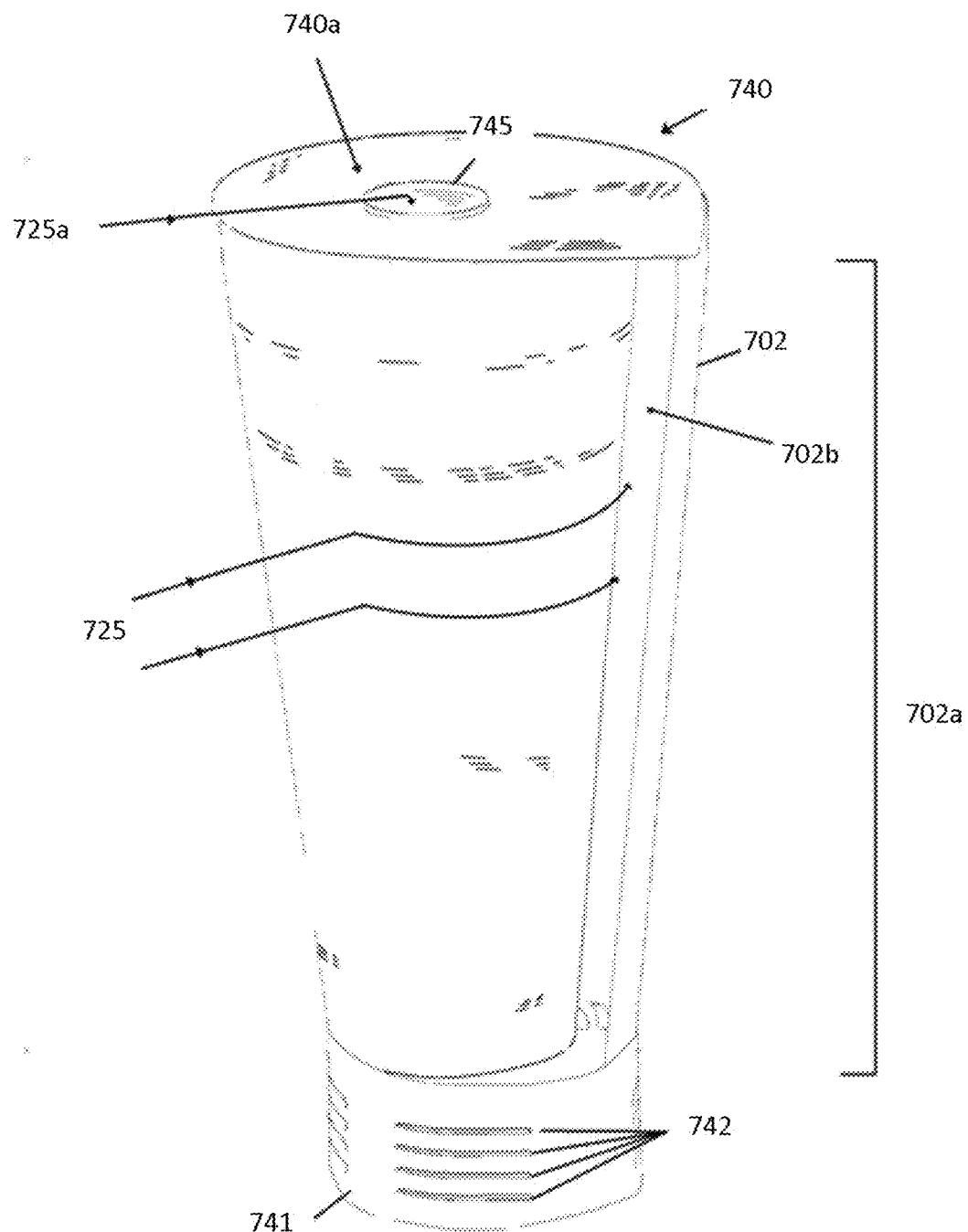

FIG. 7A-7B illustrate the partial cross-sectional side view and the top perspective view, respectively, of a VVFF turbine 740 with a specialized mixed flow turbine blade and electrical motor, according to an aspect. The design of the specialized mixed flow turbine blade rotor may help in the establishment and maintenance of the lowest pressure within the base interior, in order to maintain the vortex 727 created in various wind environments, and thus increase the efficacy of energy harvesting through an implemented electric motor 761. Air flow may enter radially 725 through the intake opening 702b, potentially forming a vortex 727, traveling downward and accelerating through the turbine chamber, traveling into the base through vertical exhaust slots (not shown), to be expelled radially 725b at the base 741 through vents 742, or may enter axially 725a through the upper opening 745, traveling downward through the Venturi tube, accelerating as a result of the constricted section 743a, flowing into the base through the center of the outlet disbursement blade assembly, to be expelled radially 725b through the same vents 742. When air flow enters the turbine radially 725 through the intake opening 702b, the resultant spin of the vertical blades 744 as the result a formed vortex 727 may create a low pressure zone 762 within the turbine, after a certain RPM threshold is reached. The low pressure zone in the turbine may result in the suctioning of additional air into the intake opening 702b, helping to maintain the vortex 727 in the turbine. A low pressure zone is also created in the Venturi tube during axial flow, as a result of the air accelerating through its constricted section 743a. As a result of the vertical blade angle guiding and accelerating radially ingested wind downward for axial expulsion into the base and the axial flow and acceleration of wind through the Venturi tube for axial expulsion into the base, a lowest pressure zone may be established in the base interior 747, which may help to maintain the stability of the vortex 727 within the turbine and thus maintain operable conditions, even in low or mixed flow wind environments. The outlet disbursement blade assembly 757 may further help to maintain the lowest pressure zone in the base interior during rotation by disbursing the wind expelled into the base radially 725b, which may help to clear potential air blockages that would otherwise impede air flow through the base. The connection of the cavity turbine to the base 741 may allow for 360-degree rotation of the turbine into the available wind energy, in order to further optimize wind energy harvest. A suitable turbine electric motor 761, along with planetary gears and electronic elements, as applicable (not shown), may be present in the base. By utilizing impulse and lift forces with this rotor assembly, a stable vortex 727 may be formed and maintained in various wind speed environments, to enable continuous wind energy harvesting.

As noted above, the various elements of this rotor may provide it with a means to both create and maintain the lowest pressure zone in the base interior. The Venturi tube 743 accelerates axial wind 725a into the base 741 for radial expulsion 725b, regardless of the presence of the lowest pressure zone in the base interior 747, and thusly may help to both maintain and establish the lowest pressure zone. The vertical blades 744 guide and accelerate radial wind 725 down the cavity into the base 741 regardless of rotor rotation, which may aid in the formation and maintenance of the lowest pressure zone in the base interior 747 by providing additional flow into the base. The port fan(s) (not shown) may help form the lowest pressure zone in the base interior by initiating rotor rotation and thus radial wind suction into the turbine as a result of axial wind flowing through the port fans and also maintain it through the suction of axially available wind into the Venturi tube 743, resulting in additional axial expulsion into the base. The outlet disbursement blade assembly 757 may be mounted to the base of the main vertical blade assembly to assist the fluid flow exiting the Venturi tube into the base of the turbine, and thus assist in the formation of the lowest pressure zone in the base interior, as well as further assisting to maintain the lowest pressure zone in the base of the turbine by expelling the air in the base interior 747 radially as 725b to prevent air blockage in the base.

Figure 8:
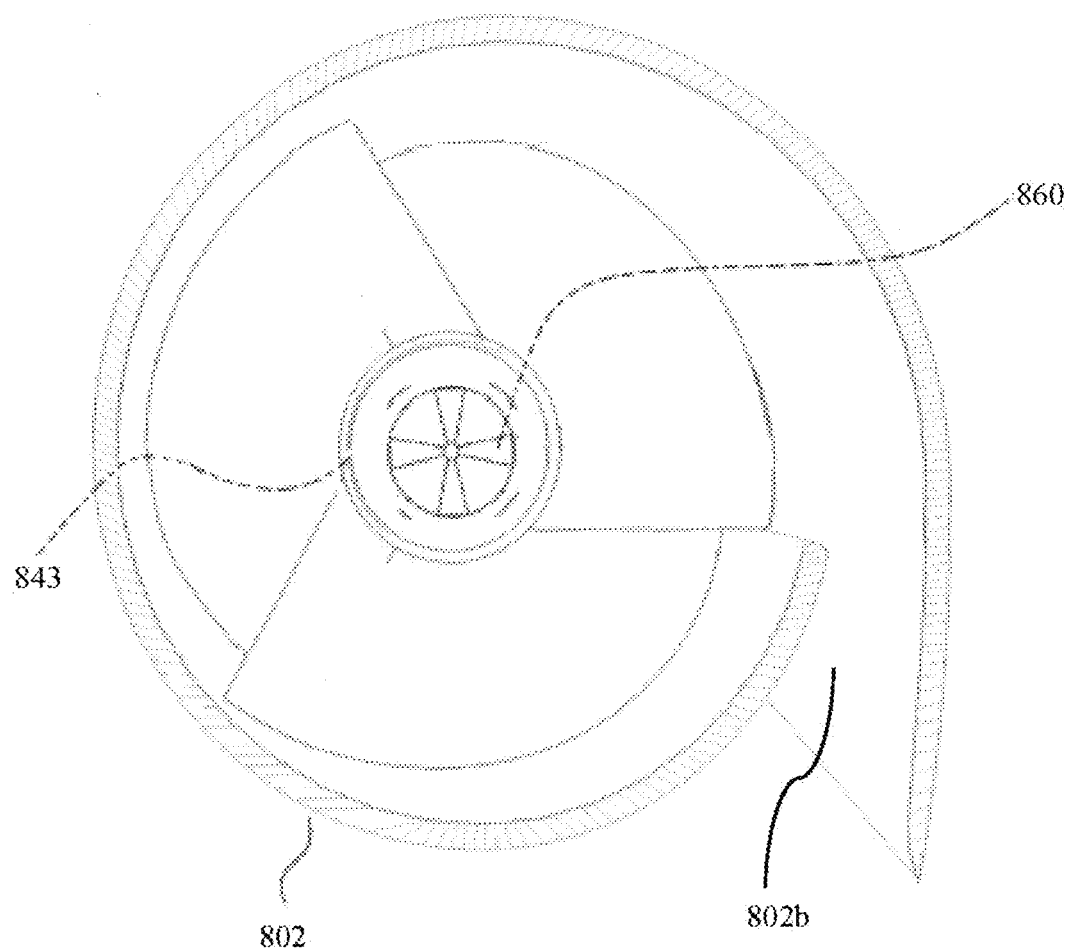
FIG. 8 illustrates the top view of the of exterior of a cavity turbine with its top removed and a specialized mixed flow turbine blade rotor installed, according to an aspect.

FIG. 8 illustrates the top view of the exterior of a cavity turbine 802 with its top removed and a specialized mixed flow turbine blade rotor installed, according to an aspect. Air may enter into the cavity turbine through the intake opening 802b or the top of the Venturi tube 843. The Venturi tube 843 may either be implemented as part of the rotor (e.g., physically connected to the blade(s)) or integrated as part of the cavity turbine. Either method will provide structural stability to the turbine assembly. One or more port fans 860 positioned coaxially with the Venturi tube near its top or bottom may assist in the maintenance of the lowest pressure zone within the base interior by suctioning axially available air into the Venturi tube during rotation for axial expulsion. Additionally, port fan(s) 860 may be allowed to rotate independently of the main rotor, depending on implementation method. Port fans that can rotate independently of the main rotor may be attached to a motor (not shown) in the base, for harvesting axial flowing wind energy delivered from the Venturi Tube exit or inducing axial flow from the interior shell independently of rotor rotation. As detailed previously, this turbine rotor may provide a method of harvesting wind energy as both impulse and lift forces, affording a turbine assembly fitted with the above-described rotor exceptional versatility.

Figures 9A, 9B:
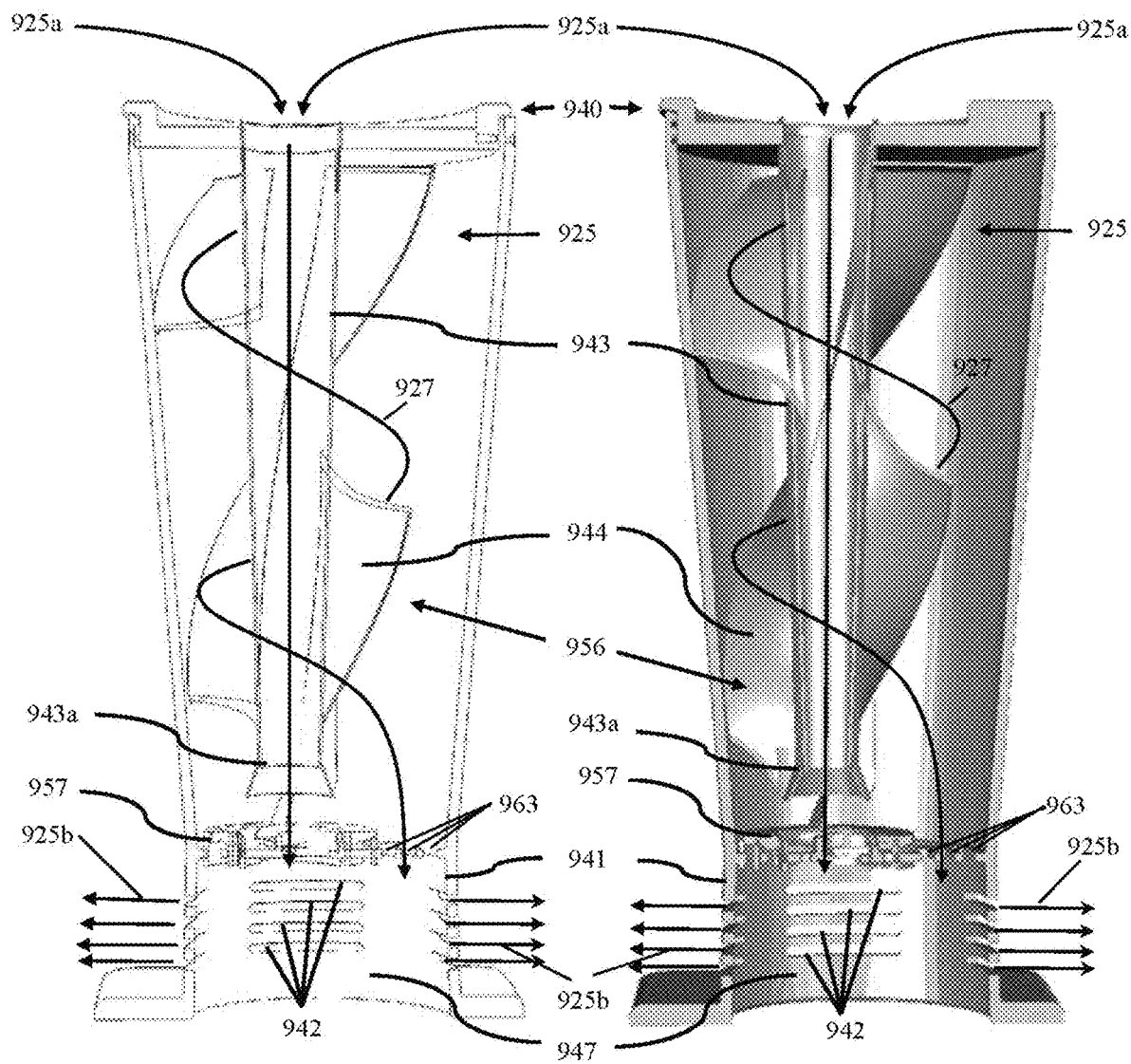
FIG. 9A-9B illustrate the cross-sectional side perspective view of a VVFF turbine with a specialized mixed flow turbine blade rotor, according to an aspect.

FIG. 9A-9B illustrate the cross-sectional side perspective view of a VVFF turbine 940 with a specialized mixed flow turbine blade rotor 956, according to an aspect. This VVFF turbine may harvest wind energy as the result of an impulse force, through wind flowing radially 925 into turbine cavity through the intake opening, or a lift force, through wind flowing axially 925a into the top of the Venturi tube 943. Radial wind 925 ingested through the intake opening is guided downward and accelerated by the vertical blades 944, and may become vortex 927, before entering the base 941 through vertical exhaust slots 963 and exiting the base radially 925b through vents 942, or axially through an opening in the base, if present. The resultant rotor rotation, upon reaching a certain RPM threshold, may result in a low pressure zone being established within the turbine cavity. Axial wind 925a ingested into the top of the Venturi tube 943, accelerates as a result of the constricted section 943a, and exits the Venturi tube axially, potentially traveling through one or more port fans near the top or bottom of the Venturi tube, before entering the base through the open center of outlet disbursement blade assembly, and exiting the base radially 925b through vents 942 or axially through an opening in the base, if present. The constriction of the axial air as it travels through the Venturi tube may result in a low pressure zone also being established in the Venturi tube. These low pressure zones help to further suction in available wind through their respective intakes, allowing for a large influx of wind to flow into the base 941. The influx and expulsion of this wind to and from the base may result in the lowest pressure zone forming or being maintained in the base interior 947, and may provide stability to vortex 927, allowing for sustained power generation as a result of rotor rotation in even low wind environments. Wind ingested through the Venturi tube 943 may travel through port fans (not shown) positioned coaxially with the Venturi tube near its top or bottom, which may result in an additional rotational force being applied to the rotor, allowing for formation of the lowest pressure zone in the base interior 947 on start-up. During rotor rotation, the port fan(s) may also provide additional suction to pull in axially available wind 925a, to maintain the lowest pressure zone. The maintenance of the lowest pressure zone in the base interior 947 may be further aided by the implementation of the outlet disbursement blade assembly 957 which may help to expel potential wind blockages radially as 925b out of the vents 942.

As detailed previously, both axial flow (lift force) and radial flow (impulse force) may be utilized to establish and maintain the lowest pressure zone in the base interior 947, which may help to establish and maintain a stable vortex 927 in the turbine cavity to continually rotate the rotor, resulting in sustained wind energy harvesting, even in low wind conditions. The implementation of various elements including axial disbursement blades 957 and port fans (not shown) may help to more easily establish and further maintain the lowest pressure zone in the base interior 947. The implementation of the specialized mixed flow turbine blade rotor 956 described above as a wind harvesting assembly, may allow for a CAV or VVFF turbine to more efficiently harvest wind energy.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A wind harvesting assembly for a wind turbine, the wind harvesting assembly comprising: a Venturi tube having: a hollow interior having a first air pressure; an open top end having a first diameter; an open bottom end having the first diameter; a tube length spanning between the open top end and the open bottom end; and a constricted section located above the bottom end, the constricted section being adapted to increase a velocity of air passing through the Venturi tube and cause an expulsion of air out of the Venturi tube by having a second diameter smaller than the first diameter; a plurality of vertical wind turbine blades arranged around the Venturi tube, an outlet disbursement blade assembly disposed below the open bottom end of the Venturi tube, comprising: a flat ring having a solid outer portion and an open inner portion, the solid outer portion having a top surface attached to the bottom ends of the vertical wind turbine blades, a bottom surface, an outer surface and an inner surface; and a plurality of curved disbursement blades, the curved disbursement blades being attached to bottom surface of the solid outer portion of the flat ring; and a port fan positioned coaxially with the Venturi tube and within the open inner portion of the flat ring, comprising: a plurality of angled fan blades; a central connection hub to which the angled fan blades centrally connect; and a hub mount attached to the inner surface of the outer portion of the flat ring to which the central connection hub is attached; wherein the first air pressure within the hollow interior is lower than a second air pressure outside of the wind harvesting assembly, resulting in a pressure differential that causes a suction effect of a first portion of air into the open top end from wind passing over the wind harvesting assembly, such that the first portion of air becomes the air passing through the Venturi tube; and wherein the rotation of the plurality of vertical wind turbine blades is caused when a second portion of air is ingested into the wind turbine and forced to become a vortex having a higher speed than the ingested air, the vortex being a spiral air stream traveling towards the open bottom end.

2. The wind harvesting assembly of claim 1, wherein the port fan is positioned below the open bottom end of the Venturi tube.

3. The wind harvesting assembly of claim 1, wherein the port fan is positioned below the open bottom end of the Venturi tube and within the open inner portion of the flat ring.

4. The wind harvesting assembly of claim 1, wherein the port fan is positioned in the open top end of the Venturi tube.

5. The wind harvesting assembly of claim 1, wherein the port fan is positioned in the open bottom end of the Venturi tube.

6. The wind harvesting assembly of claim 1, wherein the higher speed of the vortex causes a negative pressure inside the wind turbine to be lower than a positive atmospheric pressure outside the wind turbine, thus causing a second partial vacuum effect that assists in drawing more wind into the wind turbine.

7. A wind turbine comprising a wind harvesting assembly within an interior of a housing, the housing having: a top housing end; a base at a bottom housing end, the base having a hollow base interior, a top base end, a bottom base end, and means for a first expulsion of air out of the wind turbine; an intake opening spanning between the top housing end and the bottom housing end; a Venturi tube having: a hollow interior having a first air pressure; an open top end having a first diameter, the open top end being located at the top housing end; 26 an open bottom end having the first diameter, the open bottom end being located at the top base end; a tube length spanning between the open top end and the open bottom end; and a constricted section located above the bottom end, the constricted section being adapted to increase a velocity of air passing through the Venturi tube cause a second expulsion of air out of the Venturi tube by having a second diameter smaller than the first diameter; a plurality of vertical wind turbine blades arranged around the Venturi tube, wherein each vertical blade of the plurality of vertical wind turbine blades has: a blade top end; a blade bottom end; and a blade length spanning between the blade top end and the blade bottom end, the length being the same as the tube length, and being aligned with the tube length, such that the blade top end is aligned with the open top end, and the blade bottom end is aligned with the open bottom end; and an outlet disbursement blade assembly disposed below the open bottom end of the Venturi tube; wherein the first air pressure within the hollow interior is lower than a second air pressure outside of the wind harvesting assembly, resulting in a pressure differential that causes a suction effect of a first portion of air into the open top end from wind passing over the wind harvesting assembly; and wherein the rotation of the plurality of vertical wind turbine blades is caused when a second portion of air is ingested into the wind turbine and forced to become a vortex having a higher speed than the ingested air, the vortex being a spiral air stream traveling towards the open bottom end.

8. The wind harvesting assembly of claim 7, wherein the outlet disbursement blade assembly comprises a flat ring having a solid outer portion and an open inner portion, the solid outer portion having a top surface, a bottom surface, an outer surface and an inner surface.

9. The wind harvesting assembly of claim 7, wherein the outlet disbursement blade assembly comprises a plurality of disbursement blades.

10. The wind turbine of claim 7, wherein the means for the first expulsion of air out of the wind turbine comprises an opening at the bottom base end.

11. The wind harvesting assembly of claim 8, wherein the outlet disbursement blade assembly comprises a plurality of curved disbursement blades attached to the flat ring.

12. The wind harvesting assembly of claim 8, wherein the top surface of the flat ring is attached to the bottom ends of the vertical wind turbine blades.

13. A wind harvesting assembly for a wind turbine, the wind harvesting assembly comprising: a Venturi tube having: a hollow interior having a first air pressure; an open top end having a first diameter; an open bottom end having the first diameter; a tube length spanning between the open top end and the open bottom end; and a constricted section located above the bottom end, the constricted section adapted to increase a velocity of air passing through the Venturi tube and cause an expulsion of air out of the Venturi tube by having a second diameter smaller than the first diameter; a plurality of vertical wind turbine blades arranged around the Venturi tube such that each vertical blade of the plurality of vertical wind turbine blades is disposed between a shell of the wind turbine and the Venturi tube, and a port fan positioned coaxially with the Venturi tube, wherein the first air pressure within the hollow interior is lower than a second air pressure outside of the wind harvesting assembly, resulting in a pressure differential that causes a suction effect of a first portion of air into the open top end from wind passing over the wind harvesting assembly, such that the first portion of air becomes the air passing through the Venturi tube; and wherein a rotation of the plurality of vertical wind turbine blades is caused by wind ingested into the wind turbine.

14. The wind harvesting assembly of claim 13, wherein the port fan comprises a plurality of fan blades.

15. The wind harvesting assembly of claim 13, wherein the port fan comprises a connection hub to which fan blades are attached.

16. The wind harvesting assembly of claim 14, wherein each blade of the plurality of fan blades is angled.

17. The wind harvesting assembly of claim 15, wherein the connection hub is held by a hub mount, the hub mount being positioned coaxially with the Venturi tube.

18. The wind harvesting assembly of claim 15, wherein the connection hub and attached fan blades rotate independently of the vertical wind turbine blades.

19. The wind harvesting assembly of claim 15, wherein the connection hub and attached fan blades rotate with the vertical wind turbine blades.

20. The wind harvesting assembly of claim 18, wherein the connection hub is attached to a motor.

* * * * *